(12) United States Patent
Shimizu et al.

(10) Patent No.: US 8,064,171 B2
(45) Date of Patent: Nov. 22, 2011

(54) MAGNETIC DISK DRIVE AND VOICE COIL MOTOR

(75) Inventors: Toshihiko Shimizu, Ibaraki (JP); Keiko Watanabe, Ibaraki (JP); Shigeo Nakamura, Kanagawa (JP); Noritaka Otake, Ibaraki (JP)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 485 days.

(21) Appl. No.: 12/321,187

(22) Filed: Jan. 16, 2009

(65) Prior Publication Data

US 2009/0190266 A1    Jul. 30, 2009

(30) Foreign Application Priority Data

Jan. 30, 2008    (JP) .................................. 2008-019139

(51) Int. Cl.
*G11B 5/55*    (2006.01)
(52) U.S. Cl. .................................. 360/264.9; 360/264.8
(58) Field of Classification Search ................ 360/264.9
See application file for complete search history.

(56) References Cited

U.S. PATENT DOCUMENTS

| | | | |
|---|---|---|---|
| 6,421,208 B1 * | 7/2002 | Oveyssi ..................... | 360/264.8 |
| 6,529,351 B1 * | 3/2003 | Oveyssi et al. ............ | 360/264.8 |
| 7,652,850 B2 * | 1/2010 | Suzuki et al. .............. | 360/264.9 |

FOREIGN PATENT DOCUMENTS

JP        05-122917        5/1993

\* cited by examiner

*Primary Examiner* — Son Mai (57) ABSTRACT

Embodiments of the present invention help to reduce out-of-plane excitation force exerted on a coil in a voice coil motor of a magnetic disk drive, so that vibration of a magnetic head is suppressed. According to one embodiment, a voice coil motor has a flat magnet that faces a coil, and generates a magnetic field, and yokes that apply the magnetic field generated by the magnet to the coil. The magnet is provided with a magnetic flux guiding section, absorbing leakage flux from the magnet, on a most distal end of the magnet as viewed from a pivot axis. A most distal part of the coil as viewed from the pivot axis, may be situated in an outer side with respect to the most distal end of the magnet, and the magnetic flux guiding section is provided between the most distal end of the magnet and the most distal part of the coil.

10 Claims, 9 Drawing Sheets

(a) A-A SECTION (b) B-B SECTION

MAGNETIC DISK DRIVE AND VOICE COIL MOTOR

CROSS-REFERENCE TO RELATED APPLICATION

The instant nonprovisional patent application claims priority to Japanese Patent Application No. 2008-019139 filed Jan. 30, 2008 and which is incorporated by reference in its entirety herein for all purposes.

BACKGROUND OF THE INVENTION

In a magnetic disk drive, an actuator mounted with a magnetic head at one end is rotationally driven around a pivot axis as a rotational axis of the actuator, thereby the magnetic head is positioned in an optional radial position on a magnetic disk to perform write and read. A coil is mounted on the actuator at the other end, and a voice coil motor fixed to a housing of the magnetic disk drive generates drive force for rotating the actuator. The voice coil motor is configured by a magnet for generating magnetic flux, and yokes made from a soft magnetic material for forming a magnetic circuit.

As an example of the voice coil motor,. for example, Japanese Patent Publication No. 5-122917 ("patent document 1") discloses a configuration where an auxiliary yoke is equipped in a portion of at least one side end face of the magnetic in order to effectively suppress leakage flux flowing to an external component.

The voice coil motor essentially generates force for rotating the actuator in a direction parallel to a coil plane, but sometimes induces force in a direction perpendicular to the coil plane, that is, in a direction parallel to a pivot axis due to a configuration or shape of the voice coil motor, or variation in assembly. The force is called "out-of-plane excitation force" because it works in a direction perpendicular to a moving plane of the coil. The out-of-plane excitation force is induced by a phenomenon that a magnetic field applied from the magnet to the coil has not only a component perpendicular to the coil plane, but also a component parallel to the coil plane. In particular, the out-of-plane excitation force becomes large in a voice coil motor configured by using only one magnet in order to reduce cost.

When the out-of-plane excitation force is large, the coil, a part of the actuator, vertically vibrates, which in turn causes slight vibration of a magnetic head. This results in reduction in positioning accuracy of the magnetic head onto a predetermined recording track, which is a factor of hindering high capacity of a magnetic disk drive.

The technique described in the patent document 1 includes a structure for suppressing the leakage flux flowing to an external component from the voice coil motor, which may not solve the problem of the out-of-plane excitation force generated in the voice coil motor.

BRIEF SUMMARY OF THE INVENTION

Embodiments of the present invention reduce out-of-plane excitation force exerted on a coil in a voice coil motor of a magnetic disk drive, so that vibration of a magnetic head is suppressed. According to the embodiment of FIG. 2, a voice coil motor 1 has a flat magnet 5 that faces a coil 2, and generates a magnetic field, and yokes 3 and 4 that apply the magnetic field generated by the magnet 5 to the coil 2. The magnet 5 is provided with a magnetic flux guiding section 6, absorbing leakage flux from the magnet 5, on a most distal end 5a of the magnet as viewed from a pivot axis 7. A most distal part 2a of the coil as viewed from the pivot axis 7, may be situated in an outer side with respect to the most distal end 5a of the magnet, and the magnetic flux guiding section 6 is provided between the most distal end 5a of the magnet and the most distal part 2a of the coil.

BRIEF DESCRIPTION OF THE DRAWINGS

FIGS. 6(a)-6(c) are views showing an analysis result of magnetic field distribution on a magnet's most-distal end 5a.

DETAILED DESCRIPTION OF THE INVENTION

Embodiments of the present invention relate to a magnetic disk drive, and more particularly relate to a voice coil motor for accurately positioning a magnetic head.

An object of embodiments of the invention is to reduce the out-of-plane excitation force exerted on a coil in a voice coil motor, so that vibration of a magnetic head is suppressed.

Embodiments of the invention include a magnetic disk drive having a magnetic disk, a magnetic head that writes and reads an information signal into/from the magnetic disk, an actuator that moves the magnetic head to a desired position on the magnetic disk, and a voice coil motor that applies drive force to the actuator, the magnetic disk drive being configured such that the actuator is mounted with the magnetic head at one end, and a loop coil at the other end, and is rotatable around a pivot axis, the voice coil motor has a flat magnet that faces the coil, and generates a magnetic field, and has yokes that apply the magnetic field generated by the magnet to the coil, and the magnet is provided with a magnetic flux guiding section, absorbing leakage flux from the magnet, on a most distal end of the magnet as viewed from the pivot axis.

In one embodiment, a most distal part of the coil as viewed from the pivot axis is situated in an outer side with respect to the most distal end of the magnet, and the magnetic flux guiding section is provided between the most distal end of the magnet and the most distal part of the coil.

Embodiments of the invention include a voice coil motor that is mounted with a loop coil on one end of an actuator, and applies drive force in an in-plane direction of the coil to the actuator via the coil, which is configured such that the voice coil motor has a flat magnet that faces the coil, and generates a magnetic field, and yokes that apply the magnetic field generated by the magnet to the coil, and the magnet is provided with a magnetic flux guiding section, absorbing leakage flux from the magnet, on an end of the magnet in a direction parallel to a drive direction of the coil.

According to embodiments of the invention, out-of-plane excitation force exerted on a coil is reduced, so that vibration of a magnetic head can be suppressed. This improves positioning accuracy of the magnetic head, which contributes to high capacity of a magnetic disk drive.

Hereinafter, examples of embodiments of the invention will be described using drawings.

Figure 1:
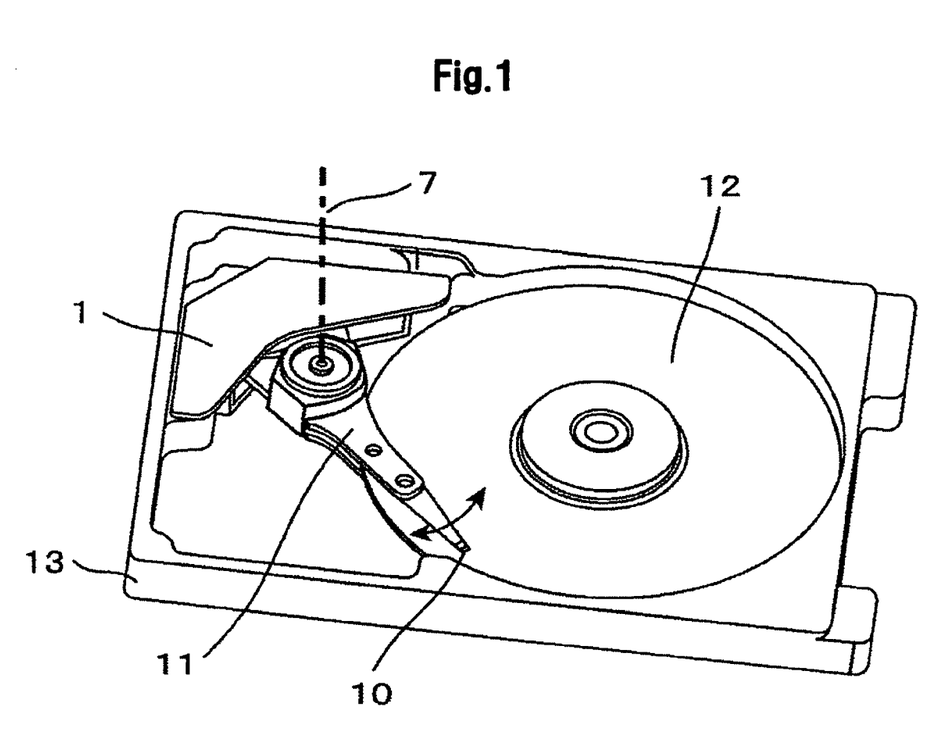
FIG. 1 is a perspective view showing an example of a magnetic disk drive using an embodiment of the invention.

FIG. 1 shows a perspective view showing an example of a magnetic disk drive using an embodiment of the invention.

In the magnetic disk drive, an actuator 11 mounted with a magnetic head 10 is rotatably supported about a pivot axis 7. Near the other end of the actuator 11, a voice coil motor 1 mounted on a base 13 generates drive force for rotating the actuator 11 so as to move the magnetic head 10 to a desired radial position on the magnetic disk 12. The magnetic head writes and reads an information signal into/from the magnetic disk 12.

Figure 2:
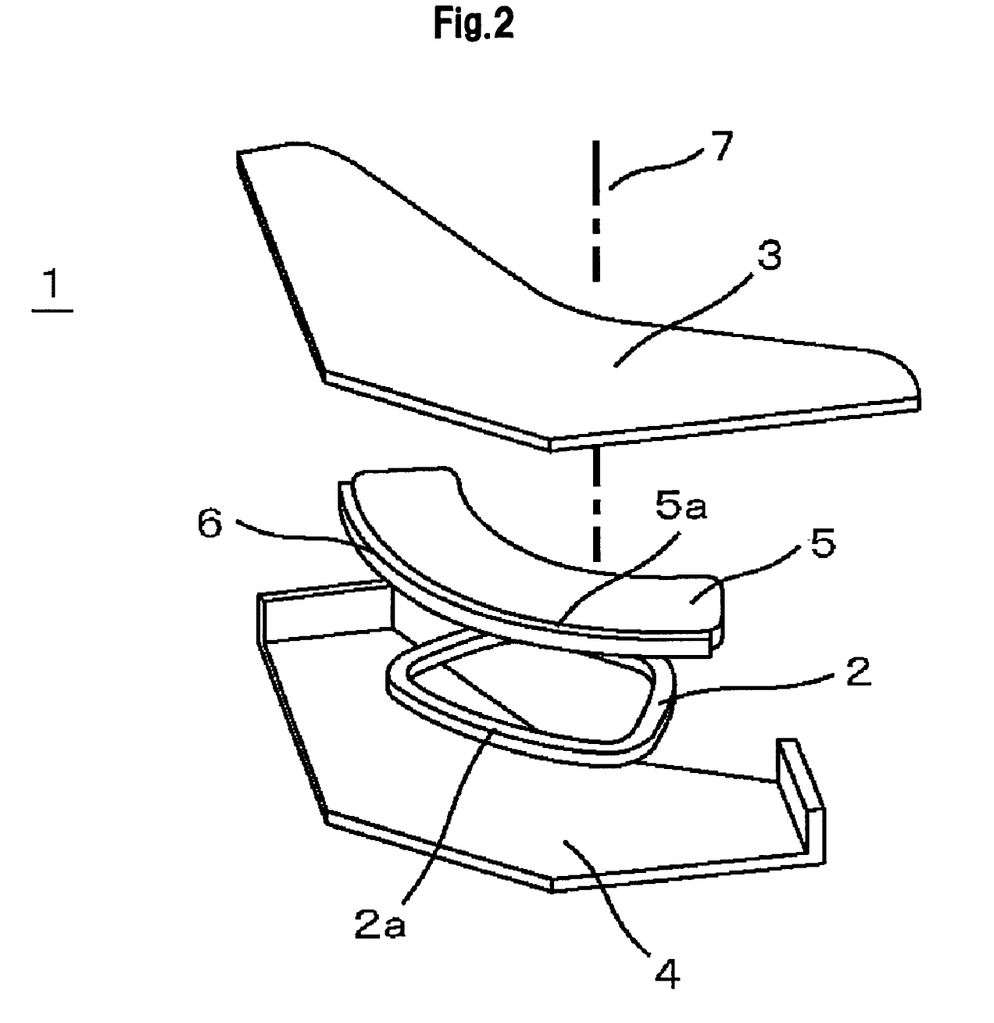
FIG. 2 is an exploded perspective view showing a first example of the voice coil motor 1 according to an embodiment of the invention.
Figure 3:
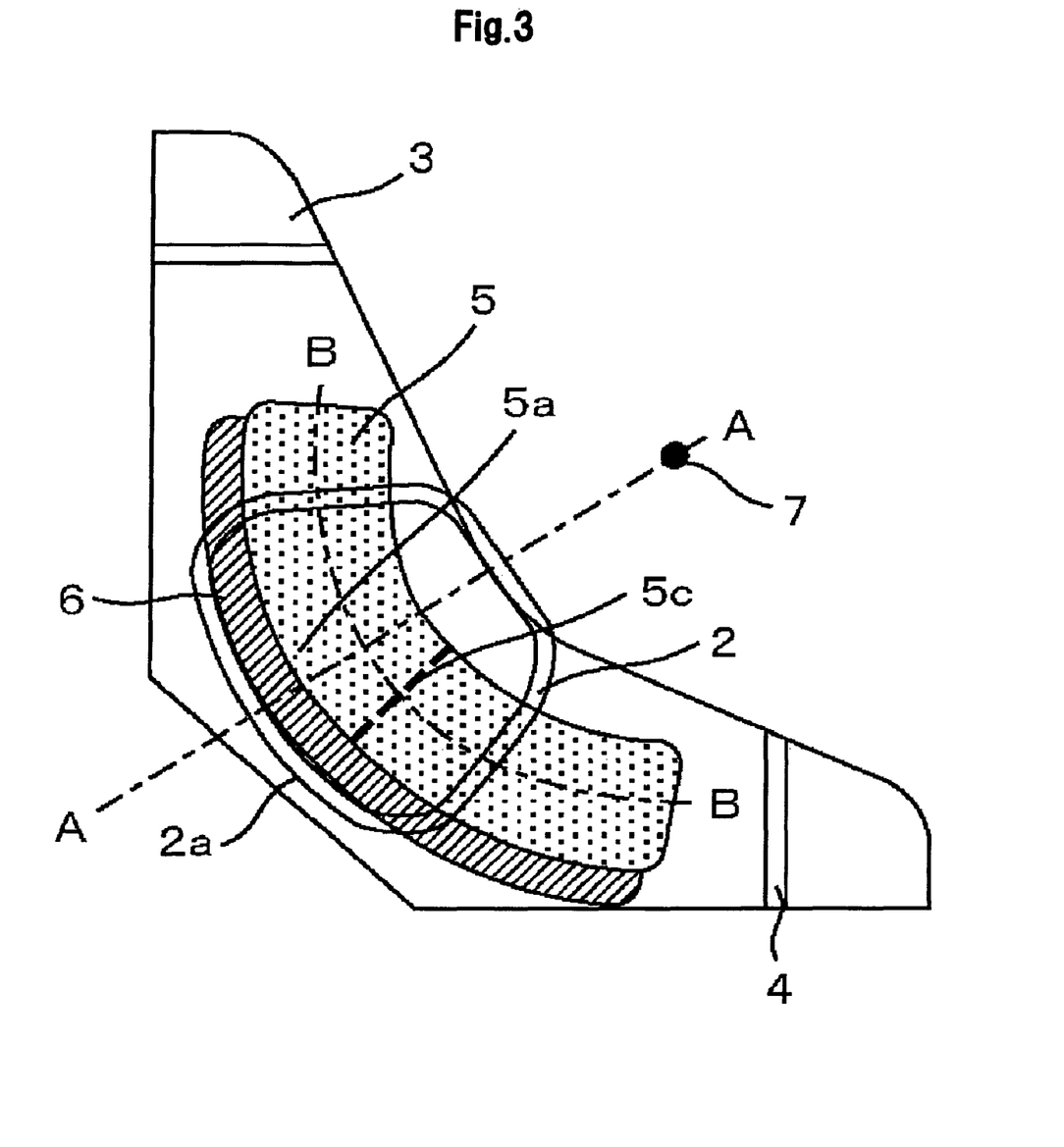
FIG. 3 is a top perspective view of the voice coil motor 1 of FIG. 2.

FIG. 2 shows an exploded perspective view showing a first example of the voice coil motor 1 according to an embodiment of the invention. FIG. 3 shows a top perspective view of the voice coil motor 1.

The voice coil motor 1 is configured by a flat magnet 5 that generates a magnetic field, a flat loop coil 2 mounted on the other end of the actuator, and an up yoke 3 and a down yoke 4 forming a magnetic circuit to efficiently apply the magnetic field generated by the magnet to the coil 2 opposed to the magnet. The magnet 5 is mounted on either side of the up yoke 3 and the down yoke 4 in some case. However, in the case shown herein, the magnet is mounted on only a side of the up yoke 3 to reduce cost. The magnet 5 is magnetized with mutually reversed polarity on either side with a neutral line 5c as a boundary.

The example is configured such that a magnetic flux guiding section 6 made from a soft magnetic material as a material is additionally formed on an end face 5a of the magnet 5, so that leakage flux from the magnet 5 is absorbed. The end face 5a is an approximately arcuate end face situated at an opposite side of the magnet 5 as viewed from the pivot axis 7. Since the end face 5a is located at a most distant position from the pivot axis 7, the end face is called "magnet's most-distal end" below. A strip 2a of the coil 2 rotationally moves adjacently to the magnet's most-distal end 5a. Since the coil strip 2a is located at a most distant position from the pivot axis 7, the coil strip is called "coil's most-distal part" below. The coil's most-distal part 2a is disposed in an outer side with respect to the magnet's most-distal end 5a. The magnetic flux guiding section 6 is shaped to have approximately the same height (thickness) as that of the magnet 5, and may have a sufficiently small width to be situated inside the opposed coil's most-distal part 2a.

Figure 4:
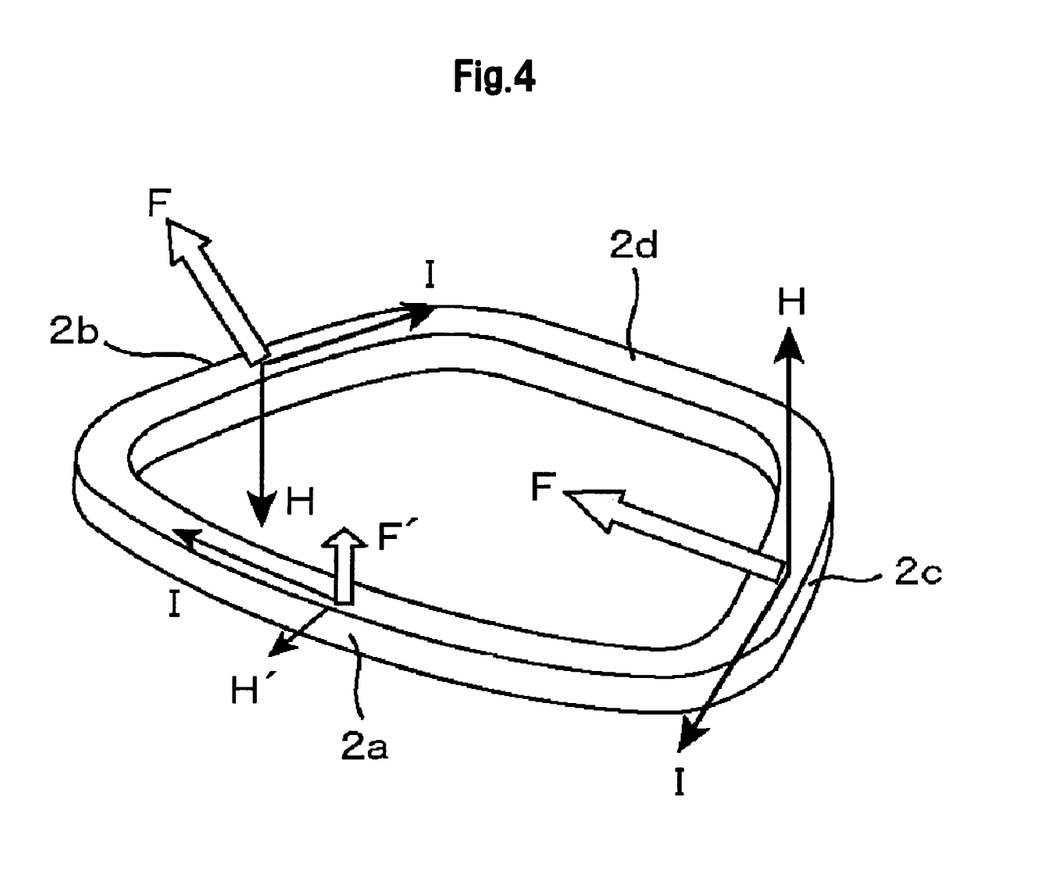
FIG. 4 is a view for illustrating a drive principle of the voice coil motor.

FIG. 4 shows a view for illustrating a drive principle of the voice coil motor. The loop coil 2 is applied with the magnetic field generated by the magnet 5, and the magnet 5 is magnetized in opposite directions on both sides, and therefore linear coil strips 2b and 2c crossing the magnet 5 are subjected to vertical magnetic fields H in opposite directions to each other. A current I is flowed into the coil 2, thereby horizontal drive force F is generated, the drive force being exerted on each of the coil strips 2b and 2c, and thereby the actuator 11 is rotationally driven in a disk in-plane direction.

On the other hand, the coil strip 2a (coil's most-distal part) is not situated directly below the magnet 5. However, since the coil strip 2a is situated near the end face of the magnet 5, the coil strip is subjected to a horizontal magnetic-field component H'. As a result, vertical drive force F' is generated, which is a factor of the out-of-plane excitation force applied to the actuator 11.

Figure 5:
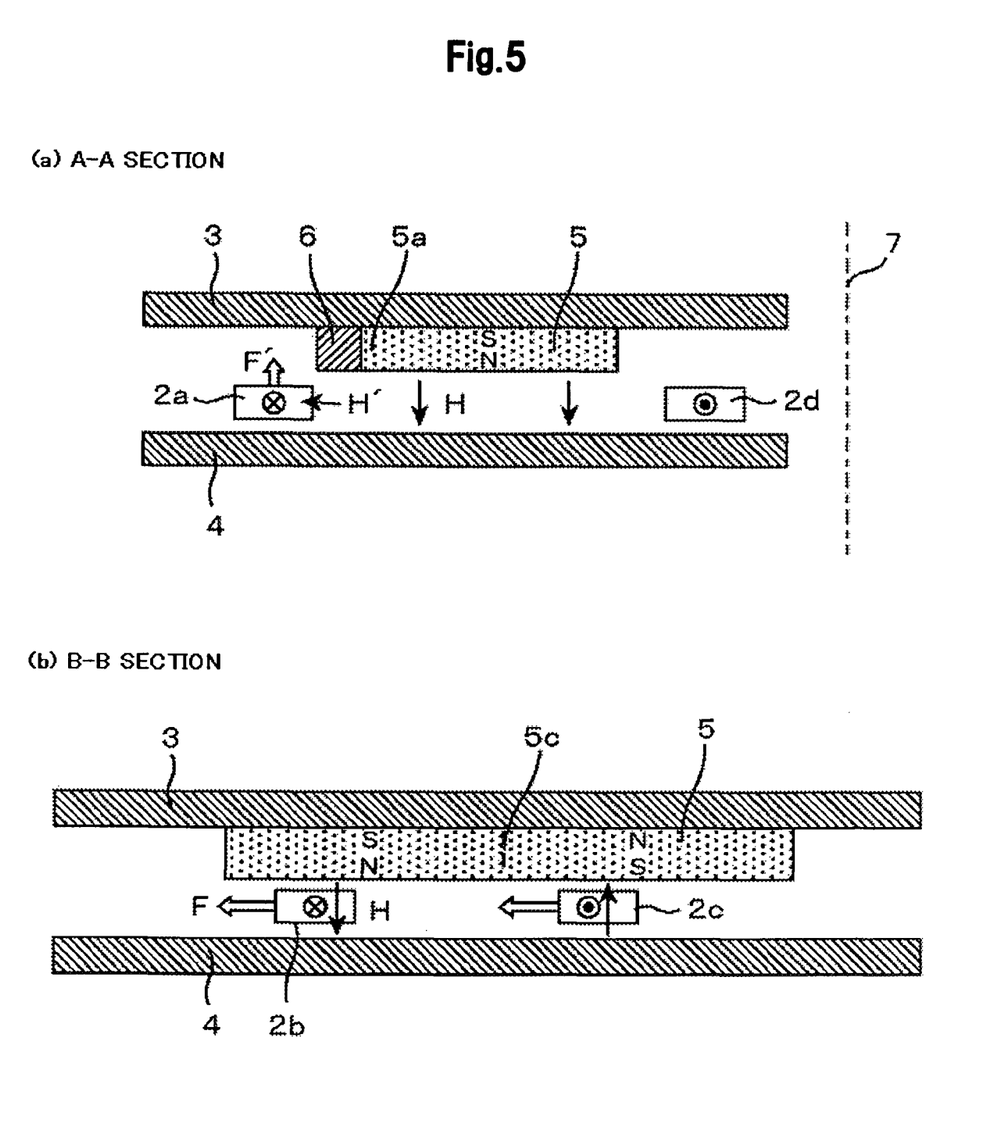
FIGS. 5(a) and 5(b) are section views of the voice coil motor I of FIGS. 2 and 3.

FIGS. 5(a) and 5(b) show section views of the voice coil motor 1 shown in FIGS. 2 and 3. FIG. 5(a) shows a section in an A-A direction in FIG. 3, where the magnet 5 is opposed to the coil strips 2a and 2d, and the coil strips 2a and 2d are disposed outside an application area of the vertical magnetic field H generated by the magnet 5. The magnetic flux guiding section 6 is provided on the most distal end 5a of the magnet 5. as viewed from the pivot axis 7. Here, the magnetic flux guiding section 6 is made to have a sufficiently small width to be situated inside the coil's most-distal part 2a so as to be prevented from extending beyond the adjacent coil strip (coil's most-distal part) 2a. FIG. 5(b) shows a section along B-B in FIG. 3, where the magnet 5 is opposed to the coil strips 2b and 2c crossing the magnet. The coil strips 2b and 2c are subjected to the vertical magnetic fields H generated by the magnet 5 in opposite directions to each other, leading to generation of the drive force F.

In FIG. 5(a), the horizontal magnetic-field component H' is generated on the most-distal end 5a of the magnet 5, so that the vertical drive force F' is exerted on the coil strip 2a. In the example, the magnetic flux guiding section 6 reduces the drive force F'. Operation of the magnetic flux guiding section is described below.

Figure 6:
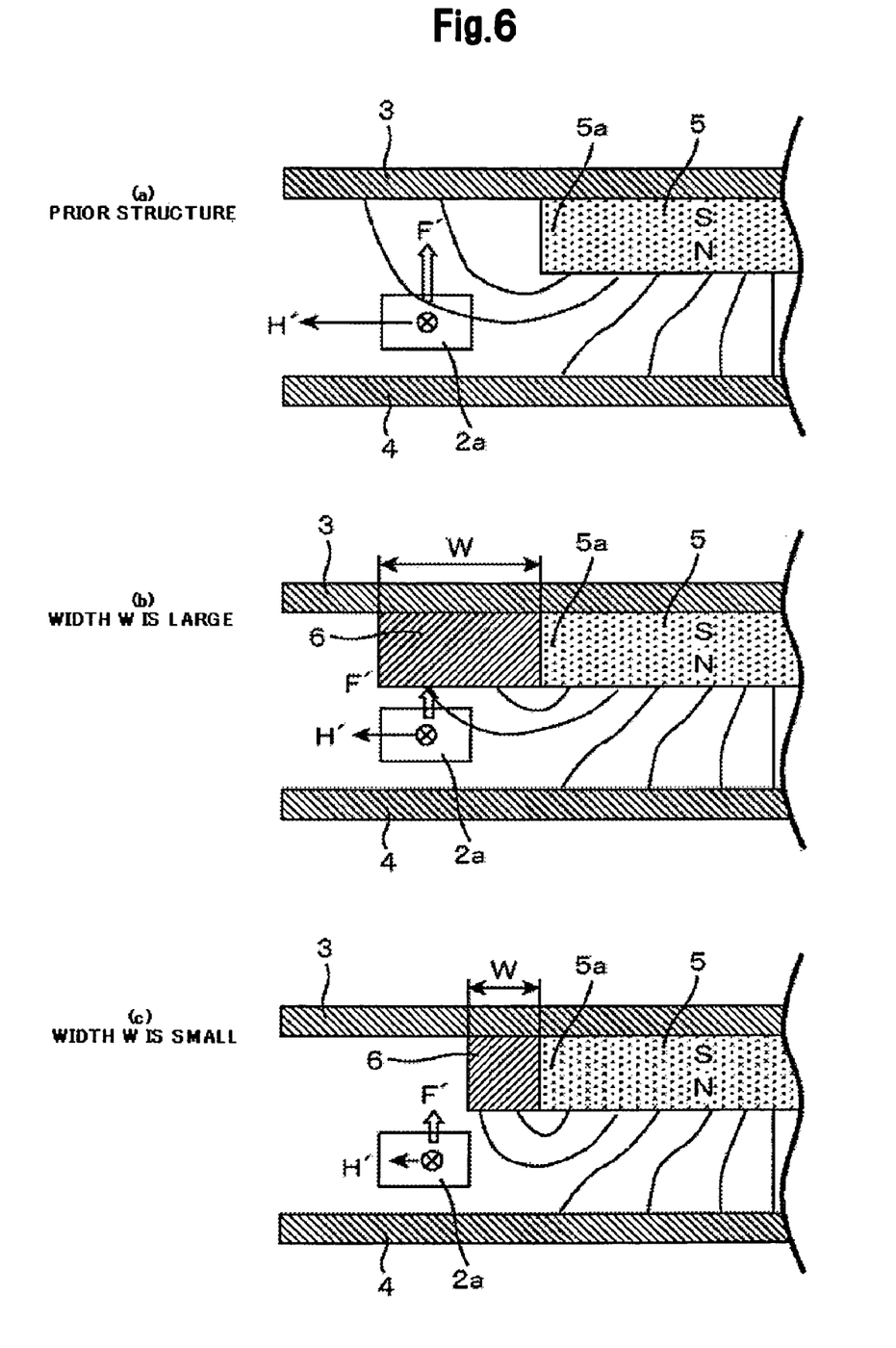

FIGS. 6(a)-6(c) show analysis results of magnetic field distribution on the most distal end 5a of the magnet 5 in FIG. 5(a). FIG. 6(a) shows a case of a prior structure for comparison. FIGS. 6(b) and 6(c) show a case that the magnetic flux guiding section is provided on the end respectively, where (b) shows a case that width W of the magnetic flux guiding section is large, and (c) shows a case that the width W is small.

As shown in FIG. 6(a), in the prior structure having no magnetic flux guiding section, magnetic flux from the magnet's most-distal end 5a may not vertically reach the down yoke 4, and partially returns to the up yoke 3 and becomes leakage flux. Therefore, the coil strip (coil's most-distal part) 2a is applied with the horizontal magnetic-field component H' as shown by an arrow, leading to generation of the vertical drive force (out-of-plane excitation force) F'.

On the other hand, in the example of FIG. 6(b), the magnetic flux guiding section 6 is provided on the magnet's most-distal end 5a, and is made to have a sufficiently large width W to cover the coil strip 2a. Since leakage flux from the magnet's most-distal end 5a is absorbed by the magnetic flux guiding section 6, the horizontal magnetic-field component H' applied to the coil strip 2a is reduced, and therefore the drive force F' is also reduced.

Furthermore, in the example of FIG. 6(c), the magnetic flux guiding section 6 is made to have a sufficiently small width W to be situated inside the coil strip 2a. Even in this case, leakage flux from the magnet's most-distal end 5a is absorbed by the magnetic flux guiding section 6. In addition, since the magnetic flux guiding section 6 is made away from the coil strip 2a, the horizontal magnetic-field component H' applied to the coil strip 2a is further reduced. To show a specific dimension example in this case, thickness of the up yoke is 1.0 mm, thickness of the down yoke is 1.0 mm, magnet thickness is 1.35 mm, and width W of the magnetic flux guiding section is 0.6 mm. Since the width W of the magnetic flux guiding section may depend on a dimension of the magnet, when W is excessively small compared with the dimension of the magnet, a reduction effect of the horizontal magnetic-field component H' is decreased.

Figure 7:
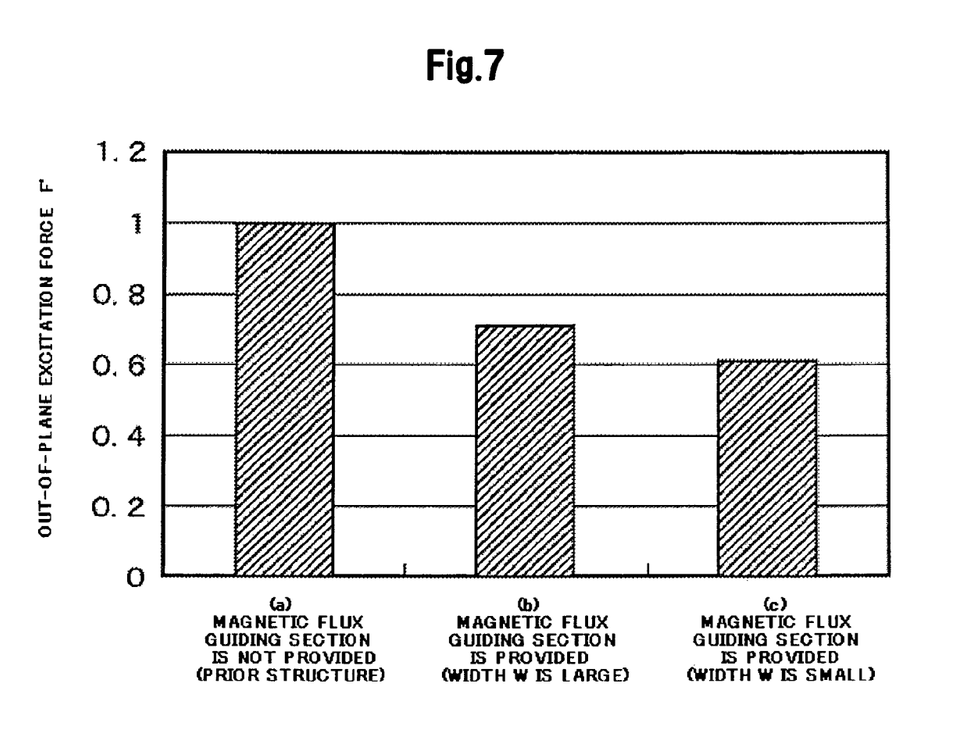
FIG. 7 is a diagram showing comparison of out-of-plane excitation force based on the magnetic field analysis result of FIG. 6.

FIG. 7 shows a diagram showing quantitative comparison of the out-of-plane excitation force in the voice coil motor based on the magnetic field analysis result between respective structures of FIGS. 6(a), 6(b) and 6(c). A vertical axis shows the out-of-plane excitation force F', which is normalized assuming that an F' value is 1 in the case of the prior structure of (a) having no magnetic flux guiding section.

In the case that the width W of the magnetic flux guiding section 6 is large as seen in FIG. 6(b), the out-of-plane excitation force F' is 0.71, which is reduced by 29% compared with the prior structure. Furthermore, when the width W is small as seen in FIG. 6(c), F' is 0.61, which is further reduced by 10% compared with the case of FIG. 6(b). This shows that when the magnetic flux guiding section 6 is made to have a sufficiently small width W to be situated inside the coil strip 2a as shown in FIG. 6(c), the reduction effect of the out-of-plane excitation force F' is largest. From this, it can be said that an optimum formation position of the magnetic flux guiding section 6 is a position on the magnet's most-distal end 5a as viewed from the pivot axis 7, which is situated in a region inside the coil's most-distal part 2a. As a result, out-of-plane excitation force exerted on the coil can be significantly decreased in the voice coil motor, and consequently vibration of a magnetic head can be suppressed in the magnetic disk drive.

In the above example, description was made on a case that the magnet was provided only on a yoke (up yoke) at one side of the voice coil motor, and the magnetic flux guiding section was provided on the most distal end of the magnet. Hereinafter, other examples are described.

Figure 8:
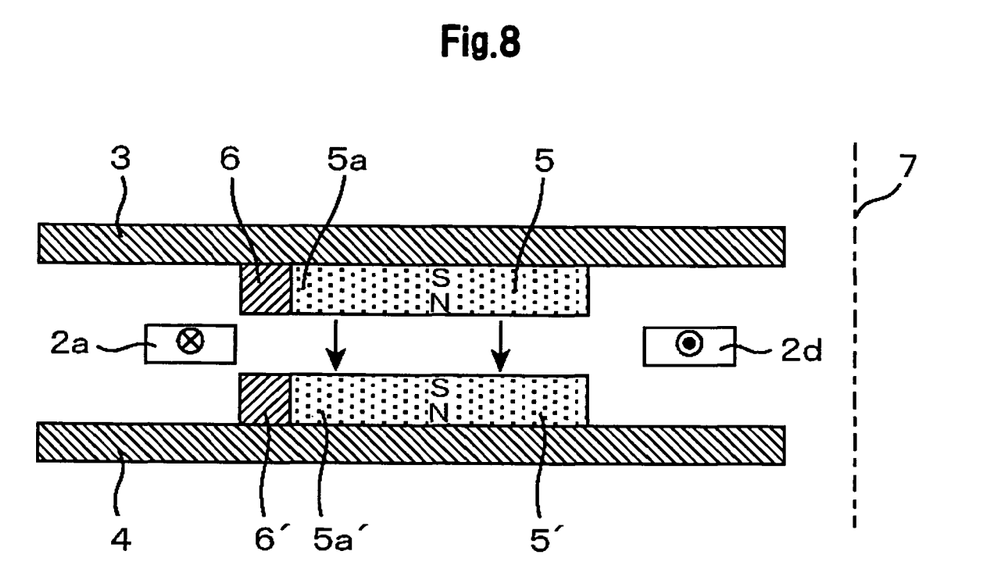
FIG. 8 is a section view showing a second example of the voice coil motor according to an embodiment of the invention.

FIG. 8 shows a section view showing a second example of the voice coil motor according to an embodiment of the invention. The example corresponds to a case that magnets 5 and 5' are provided on both of up and down yokes (an up yoke 3 and a down yoke 4) respectively, where magnetic flux guiding sections 6 and 6' are provided inside a coil's most-distal part 2a on respective magnet's most-distal ends 5a and 5a'. Even in a structure where the magnets are provided on both of upper and lower sides, out-of-plane excitation force may be generated due to a difference in shape between the upper and lower yokes or magnets, or displacement between a coil and a magnet. The out-of-plane excitation force can be surely suppressed by providing the magnetic flux guiding sections 6 and 6' in the example.

Figure 9:
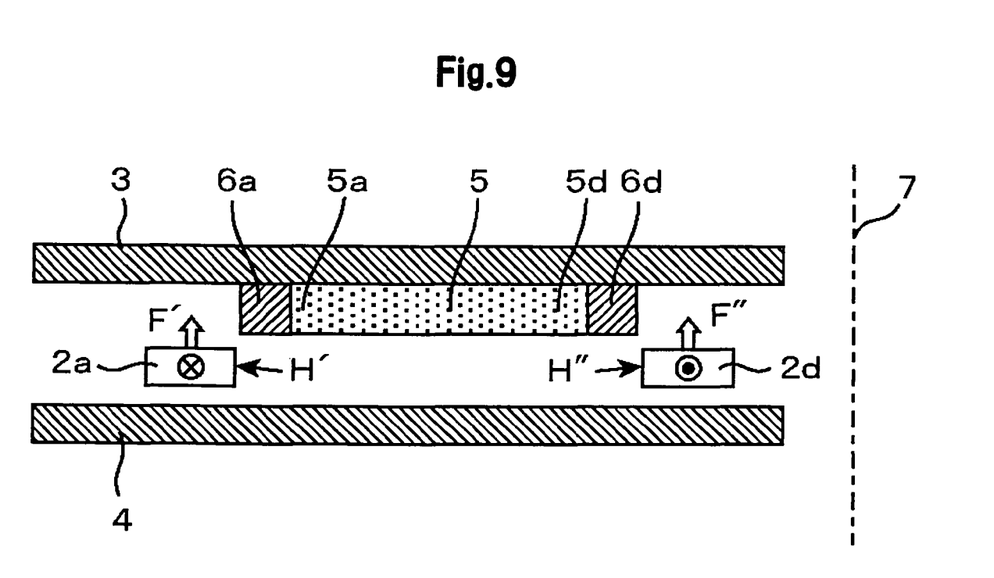
FIG. 9 is a section view showing a third example of the voice coil motor according to an embodiment of the invention.

FIG. 9 shows a section view showing a third example of the voice coil motor according to an embodiment of the invention. The example is structured such that a magnetic flux guiding section 6a is provided on a most distal end 5a of a magnet 5, in addition, a magnetic flux guiding section 6d is provided even on a magnet end (magnet's nearest end) 5d at a pivot axis 7 side. Even on the magnet's nearest end 5d, a coil strip (coil's nearest part) 2d adjacent to the magnet end 5d is subjected to a horizontal magnetic field component H" generated by the magnet 5, which is a factor of generation of out-of-plane excitation force F'". The out-of-plane excitation force F'" is less responsible for excitation torque compared with the out-of-plane excitation force F' exerted on the coil strip 2a. However, the out-of-plane excitation force F'" is reduced, thereby vibration of the magnetic head is further effectively suppressed.

Figure 10:
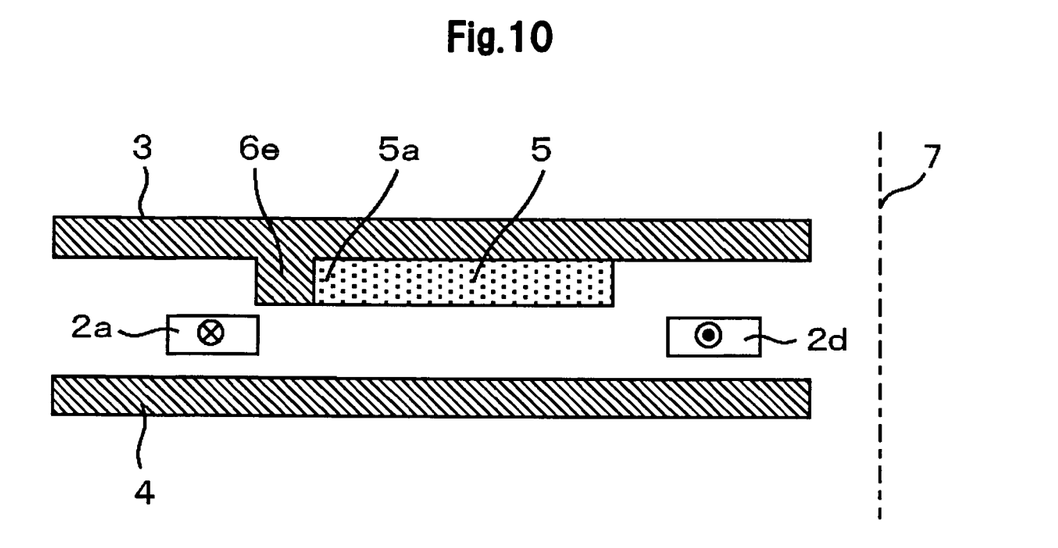
FIG. 10 is a section view showing a fourth example of the voice coil motor according to an embodiment of the invention.

FIG. 10 shows a section view showing a fourth example of the voice coil motor according to an embodiment of the invention. In the above examples, the magnetic flux guiding section 6 is provided using a member different from a member of the yoke. However, in the example, an up yoke 3 and a magnetic flux guiding section 6e are provided by the same member. That is, since the up yoke 3 and the magnetic flux guiding section 6e can be integrally formed by pressing or the like, component cost can be reduced.

Figure 11:
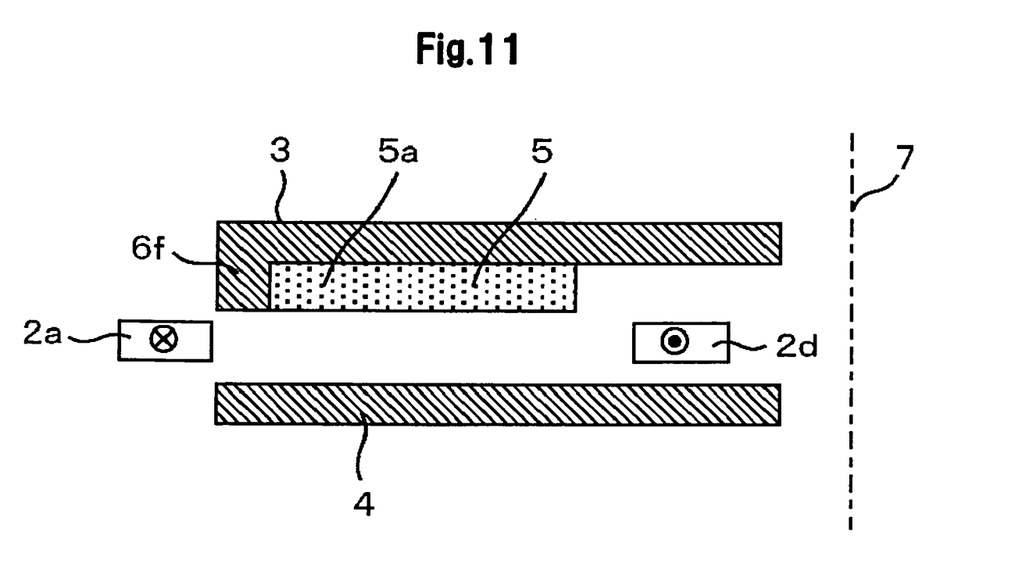
FIG. 11 is a view showing a modification of the example of FIG. 10.

FIG. 11 shows a view showing a modification of the fourth example of FIG. 10. In the modification, a magnetic flux guiding section 6f is formed integrally with an up yoke 3 by bending the up yoke. This further reduces component cost.

Each of the above examples is merely an example, and embodiments of the invention are effective even if a shape or dimension of each member is appropriately modified. Moreover, it will be appreciated that embodiments of the invention are effective even in a structure given by combining the examples with one another.

The voice coil motor according to embodiments of the invention can be used as an actuator not only for the magnetic disk drive, but also for a camera, a fine processor, and an XY stage. In such a case, a magnet of the voice coil motor can be provided with a magnetic flux guiding section, absorbing leakage flux from the magnet, on an end of the magnet in a direction parallel to a drive direction of a coil. A coil strip of the coil in a direction parallel to the drive direction may be situated in an outer side with respect to a magnet end, and the magnetic flux guiding section may be provided between the magnet end and the coil strip. Thus, an accurate actuator, in which out-of-plane excitation force is suppressed, can be achieved.

What is claimed is:

1. A magnetic disk drive, having a magnetic disk, a magnetic. head that writes and reads an information signal into/from the magnetic disk, an actuator that moves the magnetic head to a desired position on the magnetic disk, and a voice coil motor that applies drive force to the actuator, characterized in that:

the actuator is mounted with the magnetic head at one end, and a loop coil at the other end, and is rotatable around a pivot axis, the voice coil motor has a flat magnet that faces the coil, and generates a magnetic field, and has yokes that apply the magnetic field generated by the magnet to the coil, and the magnet is provided with a magnetic flux guiding section, absorbing leakage flux from the magnet, on a most distal end of the magnet as viewed from the pivot axis.

2. The magnetic disk drive according to claim 1, characterized in that:

a most distal part of the coil as viewed from the pivot axis is situated in an outer side with respect to the most distal end of the magnet, and the magnetic flux guiding section is provided between the most distal end of the magnet and the most distal part of the coil.

3. The magnetic disk drive according to claim 1, characterized in that:

the magnet is further provided with a magnetic flux guiding section, absorbing leakage flux from the magnet, on a nearest end of the magnet as viewed from the pivot axis.

4. The magnetic disk drive according to claim 2, characterized in that:

the magnet is further provided with a magnetic flux guiding section, absorbing leakage flux from the magnet, on a nearest end of the magnet as viewed from the pivot axis.

5. The magnetic disk drive according to claim 1, characterized in that:

the magnetic flux guiding section is formed integrally with the yokes.

6. The magnetic disk drive according to claim 2, characterized in that:
the magnetic flux guiding section is formed integrally with the yokes.

7. The magnetic disk drive according to claim 3, characterized in that:
the magnetic flux guiding section is formed integrally with the yokes.

8. The magnetic disk drive according to claim 4, characterized in that:
the magnetic flux guiding section is formed integrally with the yokes.

9. A voice coil motor that is mounted with a loop coil on one end of an actuator, and applies drive force in an in-plane direction of the coil to the actuator via the coil, characterized in that:
the voice coil motor has
a flat magnet that faces the coil, and generates a magnetic field, and
yokes that apply the magnetic field generated by the magnet to the coil, and
the magnet is provided with a magnetic flux guiding section, absorbing leakage flux from the magnet, on an end of the magnet in a direction parallel to a drive direction of the coil.

10. The voice coil motor according to claim 9, characterized in that:
a coil strip of the coil in a direction parallel to the drive direction is situated in an outer side with respect to an end of the magnet, and
the magnetic flux guiding section is provided between the end of the magnet and the coil strip.

* * * * *